Dec. 16, 1941.    J. W. MORSE    2,266,506
SIZING ROLL
Filed July 10, 1939
FIG_1
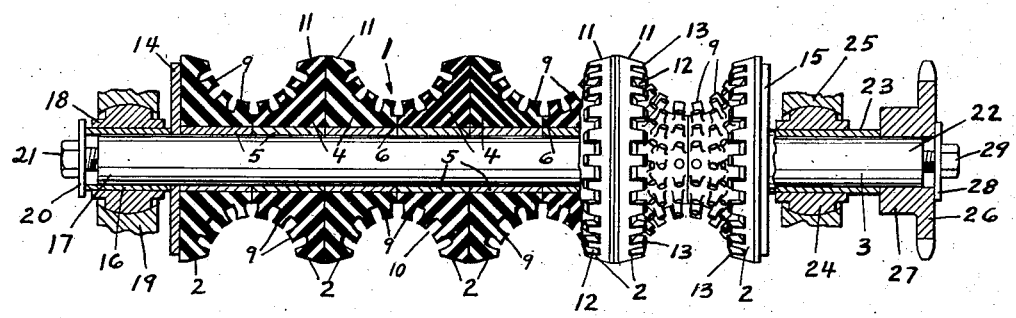
FIG_2
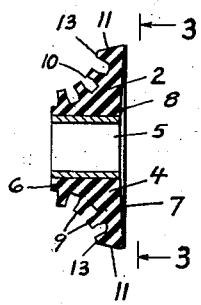
FIG_3
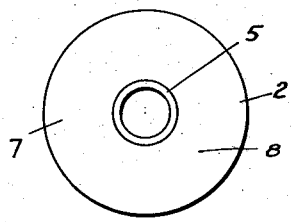
FIG_4
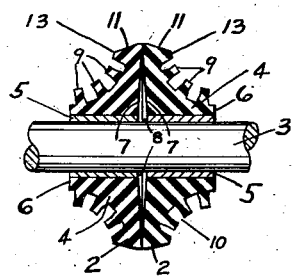
INVENTOR.
JAMES W. MORSE
BY Philip G. Minnis
ATTORNEY.

Patented Dec. 16, 1941

2,266,506

UNITED STATES PATENT OFFICE 2,266,506

SIZING ROLL

James W. Morse, East Lansing, Mich., assignor to Food Machinery Corporation, San Jose, Calif., a corporation of Delaware Application July 10, 1939, Serial No. 283,615

14 Claims. (Cl. 209—106)

The present invention appertains to rolls for treating fruit, vegetables, or the like and relates more particularly to sizing rolls for fruit grading machines such as disclosed in the copending application for U. S. Letters Patent of Harry C. Stockdale, Ser. No. 117,778, filed December 28, 1936.

These sizing rolls comprise pairs of complementary sections or discs made from resilient material such as rubber or the like assembled in endwise relation upon shafts and provided with annular grooves so that cooperating sizing rolls may perform fruit or vegetable grading operations.

Due to the flexibility of the rubber sections of these sizing rolls, dirt or other foreign matter may enter between the contacting faces of these sections, causing deformations of the same resulting in improper grading operations of the rolls.

It is, therefore, the primary object of the present invention to provide a sizing roll construction, consisting of a plurality of individual resilient sections, of improved construction whereby accumulation of foreign matter between the contacting faces of the sections thereof is eliminated and deformation of the sections is effectively prevented.

Other and further objects and advantages of the present invention will be understood from the following description and drawing, in which:

Fig. 1 is a sectional view of a fruit or vegetable sizing roll of the construction of the present invention, certain portions being shown in elevation.

Fig. 2 is a longitudinal section of an individual sizing disc.

Fig. 3 is a side view of Fig. 2 looking in the direction of lines 3—3 in Fig. 2.

Fig. 4 is a sectional detail view showing portions of adjacent pairs of discs during the assembly of the sizing rolls.

Referring now to the drawing, 1 indicates a sizing roll of a fruit or vegetable grading machine which is made up of a series of pairs of complementary molded rubber discs or spools 2 secured in end to end relation on a shaft 3.

Each rubber disc 2 comprises a body portion 4 provided with a metal bushing 5 integrally bonded thereto or secured to the same in any other desired manner. The body portion 4 of each disc 2 and its metal bushing 5 are formed to provide a small end face 6 for permitting joining of the complementary discs 2 of each pair of discs and a large end face 7 which is made slightly concave as clearly shown in Fig. 2, forming an inwardly dished end portion 8. The end of the bushing 5 adjacent the concave face 7 does not protrude from the body portion 4 into the cupped or dished portion 8, as will be clearly seen from Fig. 2.

The body portion 4 of the discs 2 is provided with radially positioned spurs or bristles 9, the ends of which define an annular groove 10 in the form of a quadrant of a circle in cross section adapted to gauge fruits or vegetables during the grading operations.

The outer periphery of the body portion 4 of each disc is provided with an inclined annular rim 11 provided with radial slots 12 to form fruit engaging projections 13 which cooperate with the bristles 9 to form the annular fruit engaging surface above referred to.

In assembling the sizing roll of the present invention the complementary discs 2 are positioned upon the shaft 3 which is received within the bushings 5 thereof so that the end faces 6 of each pair of discs are joined and the ends of the bristles 9 of complementary discs define an annular semi-circular peripheral groove while the inwardly dished ends 8 of adjacent pairs of cooperating discs 2 are adjacent each other.

Thereupon retaining washers 14 and 15 are placed adjacent each end of the series of discs on the shaft 3. The washer 14 is engaged by a sleeve 16 which receives the free end 17 of the shaft 3 and is journalled within a bearing member 18 of a self-aligning bearing 19. The sleeve 16 extends somewhat beyond the end 17 of the shaft 3 and is engaged by a washer 20 secured to the shaft 3 by means of a cap screw 21.

The other end 22 of the shaft 3 is received within a sleeve 23 slidably mounted in a bearing member 24 of a self-aligning bearing 25.

Positioned upon the end 22 of the shaft 3 is a drive sprocket 26 extending beyond the end of the shaft and provided with a hub portion 27 engaging the sleeve 23 while a washer 28 is interposed between the drive sprocket 26 and a cap screw 29 threadedly secured to the end 22 of the shaft 3.

Upon tightening of the cap screws 21 and 29 pressure is exerted by means of the sleeves 16 and 23 upon the discs 2 and their bushings 5 so that the discs are securely clamped together upon the shaft 3 and are held against rotation relative thereto and the drive sprocket 26. The dished portions 8 of adjacent resilient discs 2 are forced together by this clamping action and are flexed so that their concave faces 7 are flattened out and contact each other. In other words, adjacent dished ends of the discs 2 are pressed together from a position shown in Fig. 4 to a position illustrated in Fig. 1 and are tightly joined by the pressure created between the same.

It will, therefore, be seen that the entrance of foreign matter between the large end faces of the individual discs 2 is effectively prevented and inaccuracies in the grading operation due to deformation of the sizing roll by foreign matter entering between the contacting faces of the individual discs thereof are eliminated.

The very slight deformation of the rubber discs 2 during the assembly and clamping thereof upon the shaft 3 will not vary the accurate configuration of the annular grooves 10 and the position of the spurs 9 and projections 13 to any appreciable degree, which would impair the grading accuracy of the sizing roll; however, if desired, allowances in the molding of the rubber discs 2 may be made to compensate for even the slightest variations during the assembly of the parts, so that absolutely accurate sizing rolls may be obtained, although such critical accuracy is usually not necessary for the purposes of practice.

While I have described a particular embodiment of the present invention, it will be obvious that various changes and modifications may be made in the details thereof without departing from the spirit of the present invention, and the scope of the appended claims.

Having thus described my invention and in what manner the same may be used, what I claim as new and desire to protect by Letters Patent is:

1. A disc of readily flexible resilient material for use in making up sectional fruit treating rolls, said disc having the general form of the half section of a transversely bisected spool, and having its larger end face inwardly dished to insure a tight joint with the corresponding face of a similar disc when pressed into endwise abutting relation therewith by flexing said resilient disc.

2. A disc of resilient material for use in making up sectional fruit treating rolls, said disc having the general form of the half section of a transversely bisected spool, and having its larger end face inwardly dished to insure a tight joint with the corresponding face of a similar disc when pressed into endwise abutting relation therewith, and a tubular bearing of rigid material extending axially through said disc, the periphery of said dished face projecting beyond the plane of the end of said bearing to permit flexing of said disc.

3. A roll made up of a plurality of sections assembled end to end on a shaft, the peripheral portions of adjacent sections which form the peripheral joint between said sections being of readily flexible resilient material originally formed to project axially from each section toward the adjacent section, whereby when said sections are assembled on said shaft said peripheral projections will first come into contact, the adjacent ends of said sections being elsewhere spaced apart, and whereby the contacting peripheral portions may thereafter be flexed by pressing the section together axially on the shaft to form a sealed peripheral joint between sections.

4. A roll section comprising a disc made of readily flexible resilient material and having a small and a large end face joined by an annular recessed surface forming a groove, said large end face being inwardly dished to permit flexing thereof toward flattened condition for producing a tight joint with the corresponding end face of a similar disc when pressed into endwise abutting relation therewith.

5. A disc of readily flexible resilient material for use in making up sectional rolls, said disc having the general form of the half section of a transversely bisected spool and being provided with projecting spurs of similar material on its peripheral surface, and one of the end faces of said disc being inwardly dished to permit flexing thereof toward flattened condition for producing a tight joint with the end face of an adjacent disc when pressed into endwise abutting relation therewith.

6. A fruit treating roll comprising a shaft, a plurality of spools arranged in endwise relation on said shaft, each spool comprising a pair of discs formed of a readily flexible resilient material, such as rubber, said discs having their larger end faces inwardly dished, means cooperating with said spools for clamping the same in axial direction to press said inwardly dished faces of adjacent spools into abutting relation to obtain a tight peripheral joint between adjacent spools by placing the peripheries of said dished end faces under greater compression than the central portions of said faces adjacent said shaft when said central portions are in contact.

7. A disc of readily flexible resilient material for use in making up sectional rolls, said disc being provided with projecting spurs of similar material on its peripheral surface and having an inwardly dished end face capable of flexing toward flattened condition to produce a tight joint with the end face of an adjacent disc when pressed into endwise abutting relation therewith.

8. A disc for use in making up sectional rolls comprising a body portion provided with projecting bristles on its peripheral surface, said disc having an inwardly dished end face of readily flexible resilient material capable of flexing toward flattened condition to produce a tight joint with the end face of an adjacent disc when pressed into endwise abutting relation therewith.

9. A disc having the general form of the half section of a transversely bisected spool for use in making up sectional rolls, said disc being provided with projecting bristles on its peripheral surface and having an inwardly dished end face of readily flexible resilient material capable of flexing toward flattened condition to produce a tight joint with the end face of an adjacent disc when pressed into endwise abutting relation therewith.

10. A disc of readily flexible resilient material for use in making up sectional rolls, said disc having an inwardly dished end face and a tubular bearing of rigid material extending axially therethrough, the peripheral edge of said dished face projecting beyond the plane of the end of said bearing to permit flexing of said dished face toward flattened condition when pressed into endwise abutting relation with an adjacent disc.

11. A disc having the general form of the half of a transversely bisected spool for use in making up sectional rolls, said disc being provided with projecting bristles on its peripheral surface and having an inwardly dished end face of readily flexible resilient material, and a tubular bearing of rigid material extending axially through the disc body, the peripheral edge of said dished face projecting beyond the plane of the end of said bearing to permit flexing of said dished face toward flattened condition when pressed into endwise abutting relation with an adjacent disc.

12. A roll comprising a shaft having a plurality of discs carried in endwise abutting relation thereon, certain of said discs having inwardly dished end faces of readily flexible resilient material to permit flexing toward flattened condition when pressed into engagement with the end face of an adjacent disc, and means for clamping said discs together on the shaft to bring their end faces into compressive engagement with each other.

13. A roll comprising a shaft having a plurality of spools carried in endwise abutting relation thereon, the abutting end faces of said spools being inwardly dished and of readily flexible resilient material to permit flexing toward flattened condition when pressed into engagement with the end faces of adjacent spools, and means for clamping said spools together on the shaft to bring their adjacent end faces into compressive engagement with each other.

14. A sizing roll for grading machines, said roll being made up of a series of pairs of complementary molded rubber discs arranged end to end on a shaft, each of said discs having a small end face and a large end face, said large end faces being molded concave whereby when said discs are axially pressed together adjacent concave faces flatten out and contact each other, and means pressing said discs together on said shaft.

JAMES W. MORSE.